June 6, 1972 A. J. STREB ET AL 3,668,015

HIGH VERSATILE RADIOISOTOPE THERMOELECTRIC GENERATOR

Filed May 15, 1967

INVENTORS.
HOWARD R. KELLY
GEORGE S. STIVERS
ALAN J. STREB

BY

ATTORNEYS

United States Patent Office 3,668,015
Patented June 6, 1972

3,668,015
HIGH VERSATILE RADIOISOTOPE
THERMOELECTRIC GENERATOR

Alan J. Streb, George S. Stivers, and Howard R. Kelly, Baltimore, Md., assignors to Teledyne, Inc., Los Angeles, Calif.

Filed May 15, 1967, Ser. No. 638,367
Int. Cl. H01v *1/04, 1/30;* G21h *1/10*
U.S. Cl. 136—202 10 Claims

ABSTRACT OF THE DISCLOSURE

An improved thermoelectric generator assembly including a radioisotopic heat source capsule, thermal insulation in the form of an open-ended cup surrounding the capsule and directing the heat axially toward the open end, shielding means including an open-ended corrosive resistant cylindrical casing for receiving the cup-shaped insulation and the heat source capsule in nested fashion. Thermoelectric converter means are positioned within the open end of the cup-shaped insulation, thermally coupled to the heat source capsule, and a first highly heat conductive cover overlies the thermoelectric converted means with its periphery contacting a portion of the open-ended casing. A second corrosive resistant cover overlying the first cover, sealed to the cylindrical casing and forming therewith a highly corrosive resistant assembly.

In order to meet the demands for a small wattage electrical generator for extended use with little or no maintenance at remote terrestrial locations, there have developed in recent years, atomic powered generator systems employing thermoelectric conversion means for converting the thermal energy directly into electrical form.

A highly efficient generator design forms the subject matter of pending U.S. patent application Ser. No. 474,547, filed July 26, 1965, entitled "Low Cost Radioisotope Thermoelectric Generator," by G. S. Stivers et al. and assigned to the common assignee. Such generators allow full replacement of either the thermoelectric generator subassembly or the radioisotopic fuel capsule without the use of hot cell facilities. The design involves surrounding the radioisotopic heat source with appropriate biological shield means and placing the thermoelectric conversion portion of the apparatus in modular form, exterior of the shield means so that repairs or simple replacement of the module converter can occur without any danger to the maintenance personnel.

The present invention is directed to an improved generator assembly providing maximum flexibility without requiring major structural modifications. The generator of the present invention may be maintained for extreme periods in an excessively corrosive atmosphere without seriously affecting either the casing proper or the cover section giving access to the interior. The present generator may be positioned beneath the surface of the sea where the waste thermal energy may be readily transferred by convection current of the liquid environment, while at the same time, means are employed for maintaining the temperature level of the casing exterior including the cover, both during shipment and extended use in the air below the maximum level defined by the controlling governmental agencies. Utilizing a double cover assembly technique, internal volume capability may be readily varied to allow additional electrical conversion equipment for control system components to be placed internally of the assembly.

It is therefore a primary object of this invention to provide an improved radioisotopic powered thermoelectric generator assembly which fully meets the atomic energy license requirements for encapsulated sources regardless of environmental use without necessitating any major modifications to each assembly.

It is a further object of this invention to provide an improved radioisotopic powered thermoelectric generator assembly which has proven ease in assembly, has full field replacement capabilities, employs a conversion means of pancake configuration and completely eliminates the heat shunt between the hot and cold sides of the thermoelectric conversion means which are inherent in conventional designs.

It is a further object of this invention to provide an improved radioisotopic powered thermoelectric generator assembly which incluudes, in addition to the thermoelectric convereter module, a limited space internally of the assembly for carrying components of the electrical control system and/or the means for effecting the desired internal environment.

It is a further object of this invention to provide an improved radioisotpic powered thermoelectric generator assembly in which a portion of the casing may be readily changed to achieve maximum environmental corrosion resistance or in which the section of the apparatus accommodating the generator control means may be readily varied without effecting the dissipation of waste heat.

It is a further object of this invention to provide an improved radioisotopic powered thermoelectric generator assembly in which the presence of the electrical converter control means within the assembly itself does not seriously impair the dissipation of waste heat rejected by the thermoelectric conversion module.

Further objects of this invention will be pointed out in the following detailed description and claims and illustrated in the accompanying drawings which disclose, by way of example, the principle of this invention and the best mode which has been utilized in applying this principle.

Figure 1:
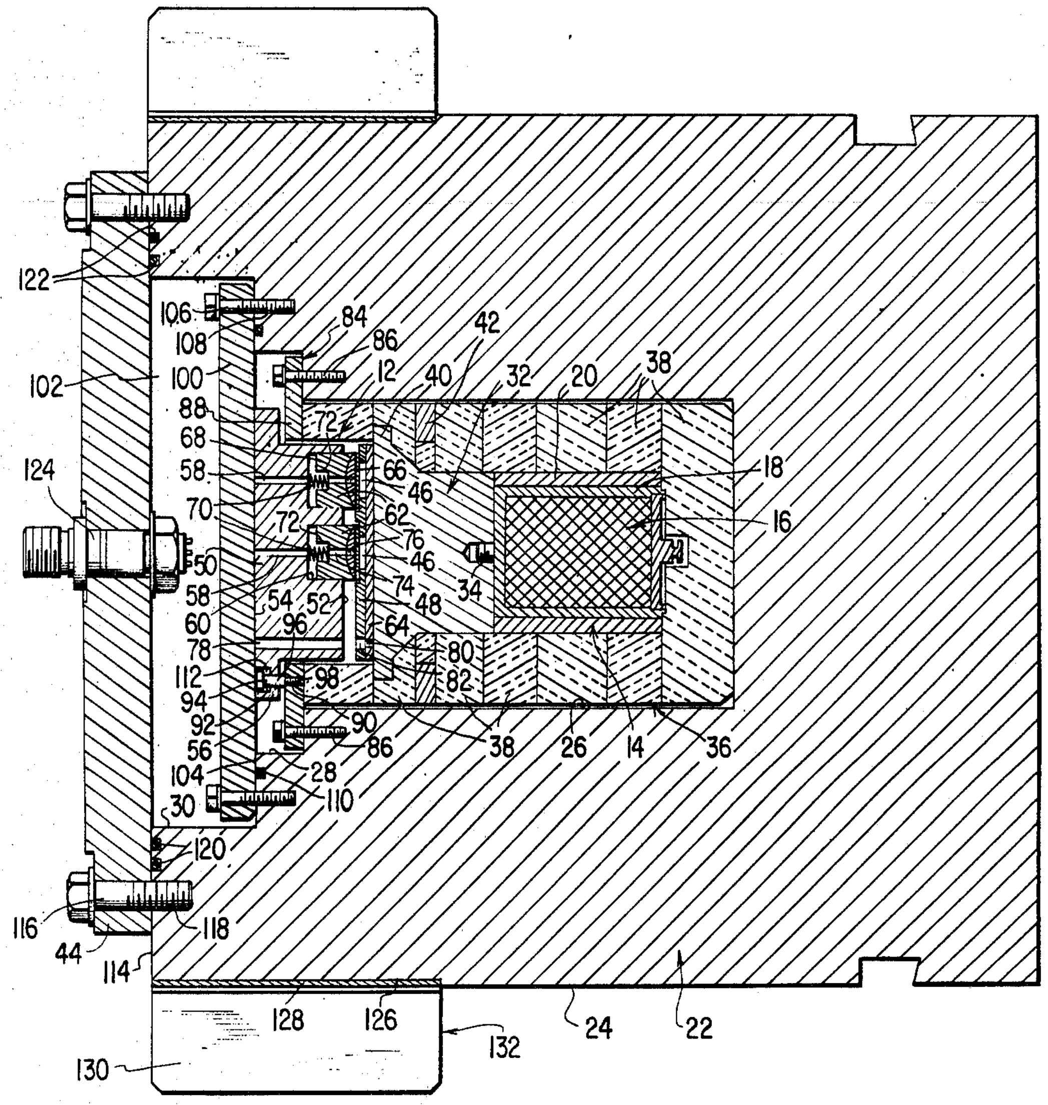
FIG. 1 is a sectional view of the improved thermoelectric radioisotopic powered thermoelectric generator assembly of the present invention in one form.

In general, the present invention is directed to an improved thermoelectric generator assembly which includes a centrally disposed radioisotopic heat source capsule carried by either an open-ended cylindrical or cup-shaped container in the form of a metal biological shield with thermal insulating means carried by the container between the capsule and the container wall. In the form shown, the insulation means is cup-shaped, with the thermal energy directed axially toward the open end of the cup-shaped insulation and the casing. Additional biological shielding means in the form of a plug is positioned within the open end of the cup-shaped insulation between the radioisotopic heat source capsule and the thermoelectric conversion means. A first cover overlies the open end of the casing, within a counterbore portion to maintain the thermoelectric generator in thermal contact with the plug-like shield, the first cover being of a highly heat conductive metal for conducting the waste heat to the massive casing member. A second corrosion resistant cover overlies the first cover, is spaced therefrom, is sealed to the cylindrical casing and forms therewith a highly corrosive resistant assembly for use in underwater or corrosive atmospheric environments. The first and second covers form a spaced wall cavity within the assembly which receives components of the electrical control system. For underwater application, at relatively high pressure, the outer cover may be in the form of a dome to prevent crushing under massive hydraulic forces.

Referring to the single embodiment, it is noted that the improved radioisotopic powered thermoelectric generator assembly includes two major sections or components, the thermoelectric conversion means 12 and the radioisotopic heat source indicated generally at 14. In line with the referred to application, the axial positioning of the thermoelectric conversion means 12 and the radioisotopic heat source 14 assures that most of the thermal energy emitted by the radioisotope capsule 16 is directed axially toward the pancake type thermoelectric conversion means 12. Further, the axial, abutting relationship between the two main sections of the apparatus conveniently allows either the thermoelectric conversion means 12 or the radioisotope capsule 16 to be removed and/or replaced in minimum time, with relative ease.

The fuel capsule 16 constitutes a gas-tight and liquid-tight element of conventional configuration and construction, which in this form comprises a metal cylinder, sealed at both ends and carrying a fuel source, such as strontium 90, plutonium 238, cerium 144, cesium 137 or other known radioisotopic fuels. In the preferred form, due to the extended life to which the generator is to be applied, strontium 90 fuel operates quite satisfactorily. The casing 18 of capsule 16 varies, depending upon a particular fuel used, since the casing or liner must be compatible with the fuel. For instance, if the fuel is strontium 90, the liner or casing 18 may be formed of "Hastelloy C," a nickel base superalloy manufactured under that trade name by Haines Stellite Corporation of Kokomo, Ind. Insofar as the present invention is concerned, the radioisotopic heat source is not critical and the use of strontium 90 fuel within a sealed Hastelloy C container is merely representative of one suitable combination which serves such a purpose. In this case, the strontium 90, having a long decay life, provides the desired thermal energy output over an extended period of time. The fuel capsule 16 is snugly received within an inner shield member 20, which in a preferred form, is formed of tungsten, although depleted uranium or other uranium alloys, such as molybdenum uranium alloy may be readily substituted therefor.

The present invention employs the "split shield" principle in which the major biological shielding constitutes the outer casing member 22, which in this case is cup-shaped in configuration having a cylindrical outer wall 24, a central bore 26 and first and second counterbores 28 and 30, respectively. In fact, it may not be necessary to employ the thin cylindrical shield member 20. The second major biological shielding element constitutes a shield plug or cap 32 which is generally T-shaped in cross-section and is threadedly coupled at 34 to one end of the radioisotopic heat source capsule 14. Thus, the two major biological shielding elements defined the "split shield." In this respect, the diameter of the section of the plug seal 32 in contact with the fuel capsule is generally equal to the outer diameter of the cylindrical shield member 20. The assembly advantageously uses a minimum volume of thermal insulation. The thermal insulation 36 is of open-ended cup-shaped configuration and is received within the bore section 26 of casing 22. The insulation comprises a series of apertured and solid disks 38 which may be formable, hardened fibrous insulator material manufactured under the brand name "Min-K" by the Johns-Mansville Corporation of Mansville, N.J. Obviously, the series of stacked disks may be replaced by a single cast element formed of the same material or an equivalent unitary thermal insulation member. The shield plug 32 is enlarged at its outer end forming a flange 40 which partially overlies a portion of the cup-shaped insulation assembly 36. This flange 40 of the plug acts in conjunction with an annular biological shield ring 42 to prevent low energy radiation scattered by the Min-K insulation disk sections 38 from passing axially out of the open end of the cup-shaped assembly. While the basic split shield concept involves the primary shield members 32 and 22, the thin cylindrical shield member 20 and the annular shield ring 42 act jointly therewith to prevent harmful radiation necessarily emitted by the radioisotopic fuel section 16 from passing exteriorly of the assembly, especially through the open end of the cup-shaped assembly in the vicinity of of the thermoelectric conversion means 12. The biological shield members 32 and 42 may comprise tungsten, depleted uranium or like materials, since they function totally as radiation barriers, although the shield plug 32 further acts to conduct heat axially from the fuel 16 to the thermoelectric conversion means 12. The outer shield member, on the other hand, which in this case constitutes the cup-shaped casing 22, may be positioned for an extended period of time beneath the surface of the sea or perhaps within a highly corrosive atmosphere. In this case, it is preferable to have the casing 22 formed of wrought steel, a corrosion resistant steel alloy or other suitable metal. Obviously, if the radioisotopic powered thermoelectric generator assembly were placed beneath the surface of the sea, the material forming the outer cover 44 would have to be compatible with the main casing section 22 or electrolytic action would result in destruction of one or both members.

The apparatus of the present invention employs thermoelectric conversion means 12 in the form of a plurality of spaced, insulated thermoelectric material elements 46, only two of which are shown which are received within and carried by an aperture insulation disk 48. The thermoelectric elements 46 are electrically and thermally coupled by cold shoes in a conventional manner. In many respects, the thermoelectric conversion means are identical to the thermoelectric conversion module disclosed and described in the referred to application. Of importance to the present conversion assembly, is the employment of a heat sink member 50 having an inner surface 52, an outer surface 54, an enlarged outer flange section 56 and a plurality of axially extending small bores 58. The bores 58 each terminate in a relatively large counterbore 60 from face 52, inwardly, which act to receive, spring-biased, slidable piston and button assembly 62. In the embodiment shown, individual piston and button assemblies 62 are provided for each thermoelectric element 46. However, only one spring, piston and button may be provided for a complete thermoelectric conversion assembly incorporating a great number of thermoelectric couples. The piston and button assemblies tend to force the thermoelectric elements 46 into good thermal contact with the thin plate or disk 64 positioned between the outer end of the shield cap 32 and the perforated element support member 48. In order to prevent electrical shorting of the elements of the assembly, the elements, such as the flattened surface of the hemispheric button 66 and the thermoelectric element contacting surface of disk 64 may be suitably "hard coated" by an anodizing coating method, such as set forth in U.S. Pat. No. 2,692,351 entitled "Method of Forming Hardened, Abrasion Resisting Coatings on Aluminum and Aluminum Alloys," issued to C. F. Burroughs and assigned to the common assignee. The hemispherical buttons 66 cooperate with the slide piston 68 to ensure full surface contact between the flattened surface of the button and its associated thermoelectric element 46. Coil springs 70 are carried within the counterbore section 72 of pistons 60, the coil springs tending to bias the piston assemblies 62 outwardly toward the heat source. The pistons are bored centrally at 74, which are axially aligned with the threaded bores 76 carried by the button. In this respect, during initial assembly of the thermoelectric converter means 12, the springs 70, the pistons 68 and their buttons 66 are positioned in place. Suitable bolts (not shown) are passed through the small bores 58 carried by the heat sink element 50, the center of their respective coil springs 70, and the bores 74 carried by the slidable piston. The ends of the bolts threadedly engage the bores 76 of the button holding the components in place prior to coupling the disks 48 carrying the thermoelectric elements 46 and the plate 64 to the assembly.

This is achieved by utilizing one or more somewhat larger axial bores 78, carried by the heat sink element 50. The bores 78 cooperate with a threaded bore 80 within disk 64, and bore 82 within the perforated insulation disk 48. With the piston and button being maintained in assembled position, the pistons being bottomed out within bores 60 and the springs 70 highly compressed, additional bolts (not shown) are passed through the bores 78 and 82 to threadedly engage bore 80 carried by heat conductive disk 64 to form a rigid assembly of these elements.

Once the thin conductive disk 64 is coupled to the heat sink member 50, the bolts used momentarily to maintain the piston and button assemblies in position, are then removed from bores 58 and the assembly is ready for positioning within the open end of the cup-like insulation body 36. This is achieved through the use of an annular support ring 84 which is slightly less in diameter than counterbore 28 of the main casing 22. Ring 84 is coupled to the casing by a plurality of bolts 86. Then inner end 88 of the annular supporting ring overlies a portion of the cup-shaped insulation. The ring is provided with a series of circumferentially spaced, threaded openings 90. The outer flange 56 of heat sink member 50 is bored and counterbored at 92 so as to receive coupling bolts 94. The coupling bolts 94 are provided with an enlarged upper section 96 and a threaded terminal end 98 of reduced cross-section, such that upon initial coupling of the heat sink to the annular supporting ring 88, the biasing force of the compression springs 70 tends to allow the heat sink member 50 to move away from the heat conducting plate 64 and the apertured disk 48, to a slightly greater extent than that occurring under normal operation, while at the same time, reducing the biasing force of the springs acting on the thermoelectric elements 46.

However, once the bolts 94 bottom out and the heat sink is secured to the casing member 22 through the intermediary of annular support ring 88, the bolts previously coupling the heat sink element 50 to the disk member 64 may be removed. The shield cap 32 prevents any movement of the assembly inwardly toward the fuel source 16, while the presence of bolts 94 limits the extent to which the heat sink elements 50 can move in an axial direction away from the heat source. It is readily apparent that upon removal of the coupling bolts from the bore 78, there will be an increase in the axial spacing between heat sink element 50 and the disk 64 as well as the thermoelectric element supporting disk 48.

The exact spacing between these elements and therefore the biasing force exerted by the compression springs 70 on the thermoelectric elements is determined principally by the position of the inner cover 100. Cover 100 is formed of a good heat conducting material, such as aluminum and acts in conjunction with heat sink member 50 to readily dissipate any waste thermal energy which is not converted into electricity by the thermoelectric converter means. Dissipation of waste heat is achieved by conducting the heat toward the periphery of the annular plate 100 and passing it directly to the conductive casing 22. This is an important aspect of the invention, since the spacing between the inner cover 100 and the outer cover 44 form a double-walled chamber 102 which prevents continued passage of waste thermal energy axially of the assembly. The inner cover of plate 100 is provided with both gas penetration means and electrical penetration means (not shown) to allow purging of the assembly cavity receiving the electrical conversion means and the radioisotopic heat source and subsequently flooding with argon or other inert gas atmosphere, while the electrical penetration means allows delivery of the generated electrical power exterior of the assembly. The counterbore 30 forms an annular ledge 104, upon which the inner cover 100 seats. The inner cover is coupled to the casing 22 by a number of bolts 106 which are received by threaded bores 108 within the casing. Appropriately, an O ring 110 acts to ensure a gas and liquid-tight seal between the spaced wall chamber 102 and the major internal area of the casing which carries both the fuel capsule 14 and the thermoelectric conversion means 12. When the inner conductive cover 100 is bolted in place to the casing 22, it tends to compress the heat sink element 50 inwardly toward thermoelectric elements 46, against the bias of compression spring 70. This creates a small axial gap 112 between the head of bolt 94 and the bottom of the counterbore section 92 which receives the bolt head. At the same time, his provides increased surface contact between the sliding pistons 60 and the heat sink 52 since the waste thermal energy passes from the pistons to the heat sink 50 principally by radial thermal conduction between these members.

While the aluminum plate or cover 100 is structurally sufficient to maintain the thermoelectric converter elements 12 and the associated isotopic heat source in the desired position to achieve maximum energy conversion efficiency and while the inner cover 100 readily transfers the waste thermal energy to the cup-shaped casing 22 for ultimate dissipation to the ambient by radiataion and/or convection, the aluminum cover 100 is normally deficient on two accounts. First, the cover, being formed of aluminum, is of such diverse material from the wrought steel casing 22 that if the casing were submerged beneath the surface of the sea, electrolysis would surely occur which would result in deterioration and ultimate destruction of the assembly. Secondly, the aluminum cover 100, in all probability, does not have the desired structural strength for use in underwater applications involving intense static fluid pressure. Further, in surface terrestrial application, the aluminum inner cover 100 would, under certain circumstances, be unable to withstand chemical or other corrosive agents present in the atomsphere.

The present invention is further directed to the employment of the corrosion resistant outer cover 44 which is compatible electrolytically with the cup-shaped casing 22 and which, in conjunction with the aluminum inner cover 100, acts advantageously to provide an electrical control component carrying chamber 102, interior of the assembly, but exterior of both the thermoelectric conversion means 12 and the isotopic fuel capsule 14. The outer cover 44 which is disk-shaped in form, may be formed of the same wrought steel as the cup-shaped casing 22. It is of a diameter in excess of the counterbore 33. Cover 44 is generally rectangular in cross-section and is suitably coupled to the outer face 114 of the cup-shaped casing member 22. In this respect, the cover 44 carries a plurality of circumferentially spaced bolts 116 which are threadably received within bores 118 carried by the casing face. To prevent fluid leakage internally of the assembly, O rings 120 are positioned within annular recesses 122 on the face 114 of the casing. Central bushing 124 provides appropriate electrical connection internally of the generator assembly to the control chamber 102 and thereafter to the thermoelectric converter section 112. In this regard, evacuation and backfill of the assembly is achieved with the outer cover removed. Only the electrical connections pass through the outer cover. For instance, it is necessary to allow evacuation and backfill of the assembly interior, with an inert gas, and the technique for achieving the same is generally identical to that employed in the referred to application. Electrical terminals to the thermoelectric converter means and the pinch tube effecting evacuation and backfilling of the Min-K insulation area are located within the chamber 102 between the inner and outer covers. The dual cover or lid arrangement allows the aluminum inner cover to transfer heat by conduction laterally to the cup-shaped steel casing 22, while the outer cover 44, which is compatible with the casing 22, allows the assembly to be positioned beneath the surface of the sea without attendant electrolytic action. A the same time, cover 44 possesses sufficient structural strength to resist compression and destruction under the high pressures attendant to the deep sea environment. For terrestrial applications, the employment of the outer cover 44 which is generally of like material to the wrought steel casing 22, provides a highly corrosion resistant assembly regardless of the nature of the environment. As stated previously, the assembly could employ instead of the flat annular outer cover 44, one of domed configuration, which would resist a greater compressive load. It is also important to note that since the cylindrical shield 20 abuts the inner end of the shield plug 32, the majority of the heat emitted from the radioisotopic fuel source 16 and radiated in an annular direction, would tend to pass, especially in the presence of the cup-shaped insulation barrier, axially through the shield plug or cap 32 in a direction toward the thermoelectric conversion means 12.

The thermoelectric generator assembly of the present invention is extremely flexible in that both the thermoelectric conversion module and the radioisotopic fuel source may be readily replaced. A generator is normally designed for a given maximum wattage load. For instance, if the generator of the present invention normally supplies a 10 watt load, the assembly may be derated by underfueling. In such a case, the radioisotopic fuel body 16 is replaced with one delivering reduced thermal energy which may, in this case, act in conjunction with the same thermoelectric conversion means 12, or a lower power level substitute to carry the somewhat reduced load.

Since, under present governmental regulations, the maximum allowed temperature of the fuel casing during commercial shipping is 180° F., it may be necessary to increase the rate of waste heat dissipation, especially during transport. This is readily achieved in the present invention by the addition of one or more radial arrays of cooling fins coupled directly to the cup-shaped casing 22. In the embodiment shown, a thin annular recess 126 is formed within the portion of the casing adjacent the outer cover 44. This annular recess 126 receives an annular strip of conductive metal, such as aluminum 128, to which is attached or integrally formed, a plurality of spaced, radially directed cooling fins 130, forming a cooling fin assembly 132. For instance, the two ends of the strip 128 may be coupled together by bolts or the like (not shown). After delivery to the use location, the annular cooling fin assembly 132 may be readily removed. This is paricularly true if an underwater application is desired, since the presence of the cooling fin assembly 132 which preferably is formed of aluminum, would undoubtedly cause electrolytic action. If desired, where the generator assembly is used for surface applications, a cooling fin assembly, such as 132, or, in fact, additional cooling fin assemblies, may remain coupled to the casing 22 to provide the desired thermal gradient for a designed electrical loading. The materials making up the thermoelectric conversions elements 46 are conventional, such as bismuth telluride or lead telluride, properly doped.

From the above, it is obvious that the generator assembly employing the double cover design provides maximum flexibility without requiring major changes during production for the specific environmental use. The inner aluminum cover serves to conduct waste heat to the vessel side walls where it is rejected to the environment. The upper or outer cover provides protection against the environment and can be changed at will. While the design shown has a flat lid and can be used in air or underwater, the upper cover or lid can also be dome-shaped to accommodate storage batteries and DC to DC voltage converters or other electrical control system components. At the same time, the use of the dome lid provides increased structural strength, especially for deep sea applications.

Figure 2:
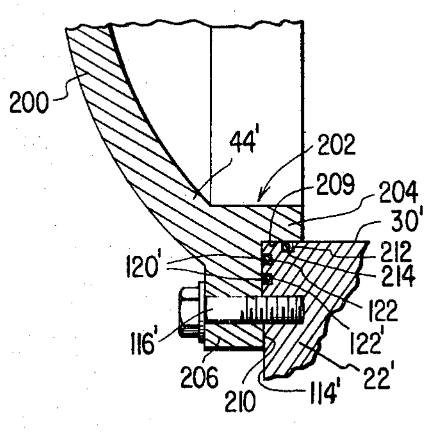
FIG. 2 is a sectional view of a portion of the generator of modified form having a domed outer cover.

Referring to FIG. 2, the outer lid or cover 44' is formed of a material compatible with casing member 22'. It is dome-shaped rather than in the form of a flat disk. In this respect, the outer cover comprises two principal portions, a dome section 200 terminating in an annular flange 202. The annular flange 202 is L-shaped in cross-section, includig right-hand portions 204 and 206. Face 209 of section 204 abuts the peripheral face of counterbore 30', while face 210 of the annular flange section 206 contacts the outer face 114' of the large shield casing 22'. Circumferentially spaced bolts 116' physically couple the dome-shaped outer cover 44' to the casing. To effect a gas and liquid-tight seal, it is noted that annular recesses 122' are formed within face 114' of the casing, the annular recesses receiving conventional O ring sealing members 120'. In this embodiment, the counterbore 30' includes an annular recess 212 which receives a third O ring 214.

Under this design, a complete power supply may be packaged in the same vessel carrying the conversion means and fuel capsule. In either case, the generator is so designed that the thermoelectric conversion system, in module form or otherwise, may be readily replaced in the field.

The present invention in either form therefore has specific advantages:

(1) The present generator assembly eliminates the need of an outgassing port in the outer lid. Only the electrical lead or leads are required to pass through the outer lid.

(2) The present generator assembly provides electrical component compartments of varying size without requiring any major modification of the generator structure.

(3) The present design permits the use of the same generator, but by switching covers, the generator may be readily adapted to special environments or to applications requiring special electrical components.

(4) The design of the outer cover concerns itself only with the electrical equipment and environmental requirements and thus, the functional requirements of the cover are completely separate from the functional requirements of the fuel body or the thermoelectric conversion equipment.

(5) The required penetration (for the electrical leads) can occur at any point along the outer cover.

(6) In the present design, the outer lid may be roughly machined since its coupling to the casing proper is primarily to form the required liquid and gas-tight seal, while the inner cover, which is much smaller, may be easily machined even though its contact surfaces with the heat sink must be perfectly flat to provide the desired maximum heat transfer by abutting contacts between these members.

(7) The present design provides an easily assembled radioisotopic thermoelectric generator, while completely eliminating all heat shunts between the hot and cold sides of the thermoelectric conversion means.

While there have been shown and pointed out the fundamental novel features of the invention, as applied to a preferred embodiment, it will be understood that various omissions and substitutions in the form and details of the device shown and in its method of manufacture can be made by those skilled in the art without departing from the spirit of the invention. It is the intention, therefore, to be limited only as indicated by the scope of the following claims.

What is claimed is:

1. An improved thermoelectric generator assembly comprising: an open-ended, cylindrical, corrosion resistant biological shield member, a radioisotopic heat suorce capsule carried by said cylindrical shield member, insulation means positioned between said capsule and said shield member for directing heat released by said capsule axially of said shield member, thermoelectric conversion means carried by said shield member and positioned in the path of said released heat, first cover means of high thermal conductivity overlying the open end of said shield member in thermal contact with said shield member and said thermoelectric conversion means for conducting waste heat to said cylindrical shield member, second cover means coupled to the said same open end of said shield member, overlying, but spaced from said first cover means, said second cover means being of corrosion resistant material; said open-ended shield member and said insulation means being cup-shaped in cross-section; said radioisotopic heat source capsule and said insulation means being positioned in nested fashion within said shield member, and said assembly further including a thermally conductive shield plug positioned within the cup-shaped insulation means, between said radioisotopic heat source capsule and said thermoelectric conversion means and forming with said outer cup-shaped biological shield member, a split biological shield.

2. The assembly as claimed in claim 1 wherein said second cover means is formed of the same material as said corrosion resistant biological shield member to prevent electrolytic action therebetween when said generator assembly is positioned beneath the surface of the sea.

3. The assembly as claimed in claim 1 wherein said first cover means comprises aluminum and said second cover means and said cylindrical shield member comprises wrought steel.

4. The assembly as claimed in claim 1 further including an annular array of heat conductive cooling fins, and means for attaching said array of cooling fins to the outer surface of said corrosion resistant biological shield member.

5. The assembly as claimed in claim 1 further including an annular ring of shielding material carried by said cup-shaped insulation, said ring acting in conjunction with said shield plug to prevent radiation scattered by said thermal insulation from passing axially of said assembly toward said thermoelectric conversion means.

6. The assembly as claimed in claim 1 wherein said radioisotopic heat source capsule is of a diameter less than the internal diameter of said cup-shaped insulation means, said assembly further includes a thin cylindrical biological shield member surrounding said heat source capsule, and axially abutting the inner end of said shield plug for ensuring maximum thermal energy heat transfer from said heat source capsule to said axially disposed thermoelectric conversion means, through said shield plug.

7. The assembly as claimed in claim 1 wherein said thermoelectric conversion means includes a plurality of thin thermoelectric elements, means for supporting said elements in position in thermal contact with the outer face of said first cover means, a heat sink member including a plurality of bores axially aligned with said thermoelectric elements, piston and button means positioned within each bore in contact with respective thermoelectric elements, and biasing springs positioned within said bores and operating against the face of said piston for mechanically biasing said thermoelectric elements in the direction of said heat source capsule, and means including said first cover means for effecting axial displacement of said heat sink in a direction toward said radioisotopic heat source capsule to increase the bias of the thermoelectric elements in response to coupling of said first cover means to said cup-shaped biological shield member.

8. The assembly as claimed in claim 1 wherein said second cover means is dome-shaped to provide increased structural resistance to static fluid pressure and increased generator system control components spaced between said inner and outer cover means.

9. The assembly as claimed in claim 1 which further includes means for fluid sealing said second cover means to said open end of said cylindrical corrosion resistant biological cup-shaped shield member.

10. The assembly as claimed in claim 9 wherein said second cover means is dome-shaped including a peripheral flange, said peripheral flange being L-shaped in cross-section with right angle surfaces contacting both the face and the periphery of the counterbore, and said means for fluid sealing said second cover means to said shield means comprises O rings carried by said shield member in both said open end face and the wall of said counterbore.

References Cited

UNITED STATES PATENTS

| | | | |
|---|---|---|---|
| 3,075,030 | 1/1963 | Elm et al. | 136—208 |
| 3,160,569 | 12/1964 | MacFarlane | 176—39 X |
| 3,262,820 | 7/1966 | Whitelaw | 136—202 |
| 3,347,711 | 10/1967 | Banks, Jr. et al. | 136—202 |
| 3,357,866 | 12/1967 | Belofsky | 136—202 |
| 3,388,008 | 6/1968 | Campana et al. | 136—205 |
| 3,401,064 | 9/1968 | Perlow et al. | 136—202 |

OTHER REFERENCES

Corliss et al.: Radioisotopic Power Generation (1964), Prentice-Hall Inc. N.J., pp. iii, 133, 134, 118, 119, 123–128 and 182–185.

ALLEN B. CURTIS, Primary Examiner

U.S. Cl. X.R.

136—205, 212